Jan. 27, 1925.                                                        1,524,107
                              G. ROBBINS
                   CONVERTIBLE KNITTED COLLAR FOR COATS
                            Filed July 24, 1922
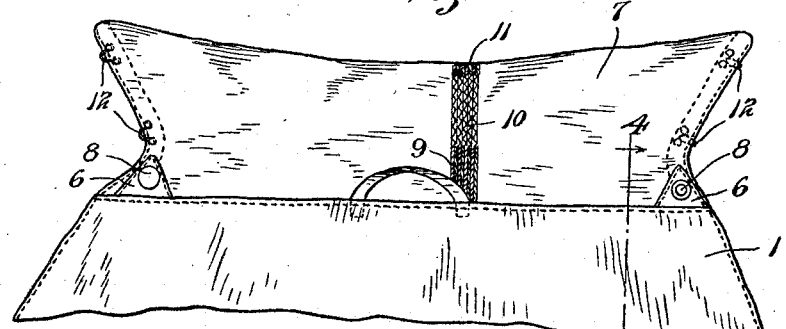
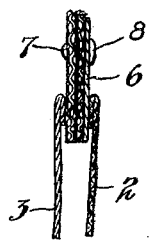
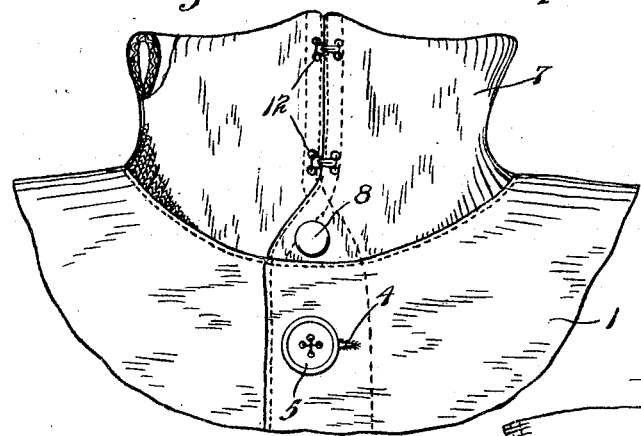
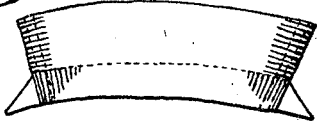
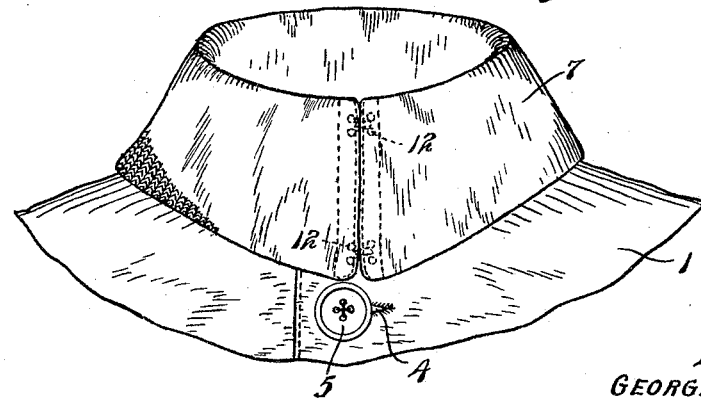
INVENTOR.
GEORGE ROBBINS.
BY HIS ATTORNEY
James F. Williamson Patented Jan. 27, 1925.

1,524,107

UNITED STATES PATENT OFFICE.

GEORGE ROBBINS, OF MINNEAPOLIS, MINNESOTA.

CONVERTIBLE KNITTED COLLAR FOR COATS.

Application filed July 24, 1922. Serial No. 576,909.

*To all whom it may concern:*

Be it known that I, GEORGE ROBBINS, a citizen of the United States, residing at Minneapolis, in the county of Hennepin and State of Minnesota, have invented certain new and useful Improvements in Convertible Knitted Collars for Coats; and I do hereby declare the following to be a full, clear, and exact description of the invention, such as will enable others skilled in the art to which it appertains to make and use the same.

This invention relates to a knitted collar adapted to be attached to a coat, which coat is made of non-extensible fabric or other material, such as leather. Coats of such fabric having an outer leather covering are now widely used for outing or hunting coats and for working men in various occupations. It has heretofore been common to provide such coats with a knitted collar of the sweater type, but such collars have been merely a short straight collar cut away at the front portion of the coat.

It is an object of this invention to provide a collar for such a coat extending completely to the corners of the sides or lapels of the coat and being adapted to be turned to various positions.

It is more specifically an object of the invention to provide such a collar formed of a folded layer of knitted fabric to form a double collar which flares or has its end edges diverging from a point adjacent the inner edge or attaching edge of the collar.

It is still a further object of the invention to have said end edges provided with outwardly extending triangular portions adjacent the inner edge of the collar to which are attached tabs extending from the coat and which portions overlap when the coat and collar are in closed position.

These and other objects and advantages of the invention will be fully set forth in the following description made in connection with the accompanying drawings in which like reference characters refer to the same parts throughout the different views and in which, Fig. 1 is a view in front elevation of the inside portion of the collar showing the collar extended;

Fig. 2 is a view in front elevation showing the collar open and disposed upwardly with its end edges fastened together;

Fig. 3 is a view in front elevation showing the collar in down-turned position forming a lay-down collar, the end edges of the collar being in closed position;

Fig. 4 is a partial section on the line 4—4 of Fig. 1 showing how the collar is attached; and Fig. 5 is a view in front elevation of the collar after it has been cut out and before it has been attached to a coat.

Referring to the drawings, a portion of the body of a coat is designated as 1, which coat is shown as comprising an inner layer 2 of some fabric material and an outer layer 3 of leather. The coat is formed with overlapping edges extending entirely to the top thereof and provided with button holes 4 and buttons 5, respectively, or with some suitable and equivalent fastening means. The top corners of the overlapping sides of the coat are provided with projecting tabs 6 and a collar designated generally as 7, is secured along its inner edge to the top portion of the body 1 of the coat and is further stitched to the tabs 6. The said tabs form a reinforcing means for the bottom corners of the collar and have attached thereto fastening means illustrated as a well known ball and socket fastening 8.

The collar 7 is formed of a layer of knitted fabric folded along its outer edge and having its end edges secured together. A double collar is thus formed which, when detached, has substantially the shape of two truncated sectors having their respective converged ends coinciding. It should be noted that the inner portion or zone 9 of the collar, as shown in Fig. 1, is formed with a closely knitted stitch, while the adjacent zone 10 is formed with a looser stitch, the portion 11 on which the fold is made being formed with a rib stitch. When the collar is attached to the coat the inner edge of the collar is stretched slightly so that it lies in the substantially straight line formed by the top edge of the coat. This rib stitch permits the collar to adjust itself to the fold and lie flat. When the collar is entirely closed or buttoned, as shown in Fig. 2, the portions 6 of the collar will overlap, the fastening member 8 being closed. The collar formed and shaped as described can be worn in three different positions. The first position is that shown in Fig. 2 when the collar is turned upwardly about the neck and forms the effect of the well known "turtle neck" sweater collar. The end edges of the collar are adapted to be brought together in parallel relation and fastening members 12 are provided on said edges illustrated as of the well known hook and eye type for holding the edges in such position. The second position of the collar is that of a lay-down or turn-down collar with the end edges separated. This position is not illustrated on the drawings but will readily be understood from the showing in Fig. 3, which shows the collar in a similar position but with the end edges brought to closed position. The position shown in Fig. 3 is the third position of wear and forms a collar of well known military type. It is thus seen that applicant has provided a well known type of coat with a greatly improved and very efficient form of knitted collar. The zone 9 of the collar is not subjected to much stretch and is therefore made with a closely knitted stitch. The zone 10 must be stretched more or less and be elastic and for this purpose the same is provided with a more open stitch. With the shape of the collar described the same lies smoothly in any of the noted positions. The collar thus not only forms a warm and comfortable protection against the weather but has a neat appearance and the coat thus forms a dressy article of wear.

The collar 7 is stitched in between the layers of leather and fabric, as illustrated in Fig. 4.

It will, of course, be understood that various changes may be made in the form, design and arrangement of the parts without departing from the scope of applicant's invention, which, generally stated, consists in the matter shown and described and set forth in the appended claims.

What is claimed is:

1. The combination with a coat of substantially non-extensible material, of a knitted collar having a substantially straight lower edge coextensive with the upper edge of said coat, and permanently secured thereto, said collar having its end edges converging for a short distance from the upper edge of said coat, then diverging to the outer edge of said collar, whereby said collar can be worn in up-turned cylindrical position or in turn-down position as a double collar.

2. The structure set forth in claim 1, the converging portions of said collar being adapted to overlap in closed position, and inter-engaging fastening means secured to said portions.

3. The structure set forth in claim 1, the diverging portions of said collar being provided with inter-engaging fastening means to hold the diverging end edges thereof in closed parallel relation in either position of said collar.

4. The structure set forth in claim 1, the converging and diverging portions of said collar being provided with fastening means for inter-engaging said converging and diverging portions respectively.

5. The combination with a coat of substantially non-extensible material, of a knitted collar having a substantially straight lower edge coextensive with the upper edge of said coat, and permanently secured thereto, said collar having its end edges converging for a short distance from the upper edge of said coat to form a trapezoid, then diverging to the outer edge of said collar, reinforcing tabs extending from the upper edge of said coat and secured to the lower corners of the trapezoid, and fastening means extending through said collar and tabs for inter-engaging said corners.

6. The combination with a coat of substantially non-extensible material having a substantially straight upper edge, when said coat is laid open, of a knitted collar having a substantially straight lower edge secured to the upper edge of said coat and coextensive therewith, said collar having its end edges converging for a short distance from said upper edge of said coat, then diverging to a greater length than the upper edge of said coat whereby the converging end edges of said collar will overlap in closed position and the diverging end edges will contact in parallel relation in either upstanding or turned-down position.

In testimony whereof I affix my signature.

GEORGE ROBBINS.